(12) United States Patent
Gorski et al.

(10) Patent No.: US 12,237,627 B2
(45) Date of Patent: *Feb. 25, 2025

(54) OPTIMIZED POWER CORD FOR TRANSFERRING POWER TO A TRANSPORT CLIMATE CONTROL SYSTEM

(71) Applicant: THERMO KING LLC, Minneapolis, MN (US)

(72) Inventors: Matthias Gorski, Bochum (DE); Eckardt Augenstein, Essen (DE); Wallace Stephen Hubbard, Chanhassen, MN (US); Matthew Srnec, Minnetonka, MN (US); Philip Lewis Lavrich, Mooresville, NC (US); Ryan Wayne Schumacher, Bloomington, MN (US)

(73) Assignee: THERMO KING LLC, Minneapolis, MN (US)

( * ) Notice: Subject to any disclaimer, the term of this patent is extended or adjusted under 35 U.S.C. 154(b) by 687 days.

This patent is subject to a terminal disclaimer.

(21) Appl. No.: 17/232,548

(22) Filed: Apr. 16, 2021

(65) Prior Publication Data
US 2021/0234319 A1    Jul. 29, 2021

Related U.S. Application Data

(63) Continuation of application No. 16/565,282, filed on Sep. 9, 2019, now Pat. No. 10,985,511.

(51) Int. Cl.
*H01R 24/28* (2011.01)
*H01R 31/02* (2006.01)
(Continued)

(52) U.S. Cl.
CPC ............. *H01R 24/28* (2013.01); *H01R 31/02* (2013.01); *H02J 7/0045* (2013.01); *H02J 7/02* (2013.01); *H01R 2107/00* (2013.01)

(58) Field of Classification Search
CPC ..... Y02T 10/70; Y02T 10/7072; Y02T 90/14; Y02T 90/16; H02J 7/0042; H02J 2310/40;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| AU | 2010331956 A1 * | 7/2012 | .......... B60L 11/1816 |
| CA | 2740460 A1 * | 11/2011 | .......... B60L 11/1824 |

(Continued)

OTHER PUBLICATIONS

Extended European Search Report, issued in the corresponding European patent application No. 20195236.3, dated Feb. 1, 2021, 8 pages.

(Continued)

*Primary Examiner* — Jean F Duverne
(74) *Attorney, Agent, or Firm* — HSML P.C.

(57) ABSTRACT

A power cord for transferring power to an electrically powered accessory configured to be used with at least one of a vehicle, a trailer, and a transport container is provided. The power cord includes a DC wire portion, an AC wire portion, and a single plug at one end of the power cord. The DC wire portion provides DC power to the electrically powered accessory. The AC wire portion provides AC power to the electrically powered accessory. The DC wire portion and the AC wire portion each have a first end and a second end. The single plug is connected to the first end of the DC wire portion and connected to the first end of the AC wire portion and includes an AC contact arrangement, a DC contact arrangement, and a communication contact arrangement.

19 Claims, 11 Drawing Sheets

(51) Int. Cl.
  *H01R 107/00*     (2006.01)
  *H02J 7/00*       (2006.01)
  *H02J 7/02*       (2016.01)

(58) Field of Classification Search
  CPC ..... B60L 53/18; B60R 16/02; B60R 16/0207;
         B60H 1/00642; H01R 9/03; H01R 13/02
  See application file for complete search history.

(56) References Cited

U.S. PATENT DOCUMENTS

| | | | |
|---|---|---|---|
| 5,231,849 | A  | 8/1993  | Rosenblatt |
| 6,280,320 | B1 | 8/2001  | Paschke et al. |
| 6,487,869 | B1 | 12/2002 | Sulc et al. |
| 6,518,727 | B2 | 2/2003  | Oomura et al. |
| 6,560,980 | B2 | 5/2003  | Gustafson et al. |
| 6,600,237 | B1 | 7/2003  | Meissner |
| 6,631,080 | B2 | 10/2003 | Trimble et al. |
| 6,652,330 | B1 | 11/2003 | Wasilewski |
| 6,688,125 | B2 | 2/2004  | Okamoto et al. |
| 6,753,692 | B2 | 6/2004  | Toyomura et al. |
| 6,925,826 | B2 | 8/2005  | Hille et al. |
| 7,011,902 | B2 | 3/2006  | Pearson |
| 7,120,539 | B2 | 10/2006 | Krull et al. |
| 7,122,923 | B2 | 10/2006 | Lafontaine et al. |
| 7,151,326 | B2 | 12/2006 | Jordan |
| 7,176,658 | B2 | 2/2007  | Quazi et al. |
| 7,206,692 | B2 | 4/2007  | Beesley et al. |
| 7,327,123 | B2 | 2/2008  | Faberman et al. |
| 7,424,343 | B2 | 9/2008  | Kates |
| 7,449,798 | B2 | 11/2008 | Suzuki et al. |
| 7,532,960 | B2 | 5/2009  | Kumar |
| 7,728,546 | B2 | 6/2010  | Tanaka et al. |
| 7,730,981 | B2 | 6/2010  | McCabe et al. |
| 7,745,953 | B2 | 6/2010  | Puccetti et al. |
| 7,806,796 | B2 | 10/2010 | Zhu |
| 7,830,117 | B2 | 11/2010 | Ambrosio et al. |
| 7,898,111 | B1 | 3/2011  | Pistel |
| 7,900,462 | B2 | 3/2011  | Hegar et al. |
| 8,020,651 | B2 | 9/2011  | Zillmer et al. |
| 8,030,880 | B2 | 10/2011 | Alston et al. |
| 8,134,339 | B2 | 3/2012  | Burlak et al. |
| 8,170,886 | B2 | 5/2012  | Luff |
| 8,214,141 | B2 | 7/2012  | Froeberg |
| 8,295,950 | B1 | 10/2012 | Wordsworth et al. |
| 8,381,540 | B2 | 2/2013  | Alston |
| 8,441,228 | B2 | 5/2013  | Brabec |
| 8,476,872 | B2 | 7/2013  | Truckenbrod et al. |
| 8,487,458 | B2 | 7/2013  | Steele et al. |
| 8,541,905 | B2 | 9/2013  | Brabec |
| 8,602,141 | B2 | 12/2013 | Yee et al. |
| 8,626,367 | B2 | 1/2014  | Krueger et al. |
| 8,626,419 | B2 | 1/2014  | Mitchell et al. |
| 8,643,216 | B2 | 2/2014  | Lattin |
| 8,643,217 | B2 | 2/2014  | Gietzold et al. |
| 8,670,225 | B2 | 3/2014  | Nunes |
| 8,723,344 | B1 | 5/2014  | Dierickx |
| 8,742,620 | B1 | 6/2014  | Brennan et al. |
| 8,760,115 | B2 | 6/2014  | Kinser et al. |
| 8,764,469 | B2 | 7/2014  | Lamb |
| 8,767,379 | B2 | 7/2014  | Whitaker |
| 8,818,588 | B2 | 8/2014  | Ambrosio et al. |
| 8,862,356 | B2 | 10/2014 | Miller |
| 8,912,683 | B2 | 12/2014 | Dames et al. |
| 8,924,057 | B2 | 12/2014 | Kinser et al. |
| 8,978,798 | B2 | 5/2015  | Dalum et al. |
| 9,030,336 | B2 | 5/2015  | Doyle |
| 9,061,680 | B2 | 6/2015  | Dalum |
| 9,093,788 | B2 | 7/2015  | Lamb |
| 9,102,241 | B2 | 8/2015  | Brabec |
| 9,147,335 | B2 | 9/2015  | Raghunathan et al. |
| 9,199,543 | B2 | 12/2015 | Brabec |
| 9,313,616 | B2 | 4/2016  | Mitchell et al. |
| 9,436,853 | B1 | 9/2016  | Meyers |
| 9,440,507 | B2 | 9/2016  | Giovanardi et al. |
| 9,463,681 | B2 | 10/2016 | Olaleye et al. |
| 9,464,839 | B2 | 10/2016 | Rusignuolo et al. |
| 9,557,100 | B2 | 1/2017  | Chopko et al. |
| 9,562,715 | B2 | 2/2017  | Kandasamy |
| 9,694,697 | B2 | 7/2017  | Brabec |
| 9,738,160 | B2 | 8/2017  | Bae et al. |
| 9,758,013 | B2 | 9/2017  | Steele |
| 9,783,024 | B2 | 10/2017 | Connell et al. |
| 9,784,780 | B2 | 10/2017 | Loftus et al. |
| 9,825,549 | B2 | 11/2017 | Choi et al. |
| 9,846,086 | B1 | 12/2017 | Robinson et al. |
| 9,893,545 | B2 | 2/2018  | Bean |
| 9,931,960 | B2 | 4/2018  | Tabatowski-Bush et al. |
| 9,975,403 | B2 | 5/2018  | Rusignuolo et al. |
| 9,975,446 | B2 | 5/2018  | Weber et al. |
| 9,987,906 | B2 | 6/2018  | Kennedy |
| 10,000,122 | B2 | 6/2018  | Wu et al. |
| 10,148,212 | B2 | 12/2018 | Schumacher et al. |
| 10,240,847 | B1 | 3/2019  | Thomas, Jr. |
| 2002/0113576 | A1 | 8/2002  | Oomura et al. |
| 2003/0043607 | A1 | 3/2003  | Vinciarelli et al. |
| 2003/0106332 | A1 | 6/2003  | Okamoto et al. |
| 2003/0200017 | A1 | 10/2003 | Capps et al. |
| 2003/0201097 | A1 | 10/2003 | Zeigler et al. |
| 2005/0057210 | A1 | 3/2005  | Ueda et al. |
| 2005/0065684 | A1 | 3/2005  | Larson et al. |
| 2006/0284601 | A1 | 12/2006 | Salasoo et al. |
| 2007/0052241 | A1 | 3/2007  | Pacy |
| 2007/0192116 | A1 | 8/2007  | Levitt |
| 2008/0177678 | A1 | 7/2008  | Di Martini et al. |
| 2008/0281473 | A1 | 11/2008 | Pitt |
| 2009/0121798 | A1 | 5/2009  | Levinson |
| 2009/0122901 | A1 | 5/2009  | Choi et al. |
| 2009/0126901 | A1 | 5/2009  | Tegar et al. |
| 2009/0178424 | A1 | 7/2009  | Hwang et al. |
| 2009/0195349 | A1 | 8/2009  | Frader-Thompson et al. |
| 2009/0228155 | A1 | 9/2009  | Slifkin et al. |
| 2009/0314019 | A1 | 12/2009 | Fujimoto et al. |
| 2009/0320515 | A1 | 12/2009 | Bischofberger et al. |
| 2010/0045105 | A1 | 2/2010  | Bovio et al. |
| 2010/0230224 | A1 | 9/2010  | Hindman |
| 2010/0312425 | A1 | 12/2010 | Obayashi et al. |
| 2010/0320018 | A1 | 12/2010 | Gwozdek et al. |
| 2011/0000244 | A1 | 1/2011  | Reason et al. |
| 2011/0114398 | A1 | 5/2011  | Bianco |
| 2011/0118916 | A1 | 5/2011  | Gullichsen |
| 2011/0162395 | A1 | 7/2011  | Chakiachvili et al. |
| 2011/0208378 | A1 | 8/2011  | Krueger et al. |
| 2011/0224841 | A1 | 9/2011  | Profitt-Brown et al. |
| 2011/0241420 | A1 | 10/2011 | Hering et al. |
| 2011/0290893 | A1 | 12/2011 | Steinberg |
| 2012/0000212 | A1 | 1/2012  | Sanders et al. |
| 2012/0116931 | A1 | 5/2012  | Meyers |
| 2012/0153722 | A1 | 6/2012  | Nazarian |
| 2012/0198866 | A1 | 8/2012  | Zeidner |
| 2012/0310376 | A1 | 12/2012 | Krumm et al. |
| 2012/0310416 | A1 | 12/2012 | Tepper et al. |
| 2013/0000342 | A1 | 1/2013  | Blasko et al. |
| 2013/0073094 | A1 | 3/2013  | Knapton et al. |
| 2013/0088900 | A1 | 4/2013  | Park |
| 2013/0158828 | A1 | 6/2013  | McAlister |
| 2013/0231808 | A1 | 9/2013  | Flath et al. |
| 2014/0018969 | A1 | 1/2014  | Forbes, Jr. |
| 2014/0020414 | A1 | 1/2014  | Rusignuolo et al. |
| 2014/0026599 | A1 | 1/2014  | Rusignuolo et al. |
| 2014/0060097 | A1 | 3/2014  | Perreault |
| 2014/0137590 | A1 | 5/2014  | Chopko et al. |
| 2014/0230470 | A1 | 8/2014  | Cook |
| 2014/0265560 | A1 | 9/2014  | Leehey et al. |
| 2015/0019132 | A1 | 1/2015  | Gusikhin et al. |
| 2015/0081212 | A1 | 3/2015  | Mitchell et al. |
| 2015/0121923 | A1 | 5/2015  | Rusignuolo et al. |
| 2015/0168032 | A1 | 6/2015  | Steele |
| 2015/0188360 | A1 | 7/2015  | Doane et al. |
| 2015/0306937 | A1 | 10/2015 | Kitamura et al. |
| 2015/0316301 | A1 | 11/2015 | Kolda et al. |
| 2015/0345958 | A1 | 12/2015 | Graham |
| 2015/0355288 | A1 | 12/2015 | Yokoyama et al. |
| 2015/0360568 | A1 | 12/2015 | Champagne et al. |

(56) References Cited

U.S. PATENT DOCUMENTS

| | | | |
|---|---|---|---|
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0081489 A1 | 3/2019 | Gerber et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0296565 A1* | 9/2019 | Connolly ............. B60L 3/0023 |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | |
|---|---|---|
| CN | 2456117 | 10/2001 |
| CN | 1885660 | 12/2006 |
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| DE | 102014208015 | 10/2015 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2002507368 A * | 3/2002 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

"Lamberet Smart Reefer on Solutrans", ZOEKEN, Jul. 28, 2015, 7 pages, available at: https://iepieleaks.nl/lamberet-smart-reefer-solutrans/.

(56) References Cited

OTHER PUBLICATIONS

U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 17/015,190, titled "Optimized Power Distribution to Transport Climate Control Systems Amongst One or More Electric Supply Equipment Stations", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,194, titled "Prioritized Power Delivery for Facilitating Transport Climate Control", filed Sep. 9, 2020, 41 pages.

\* cited by examiner

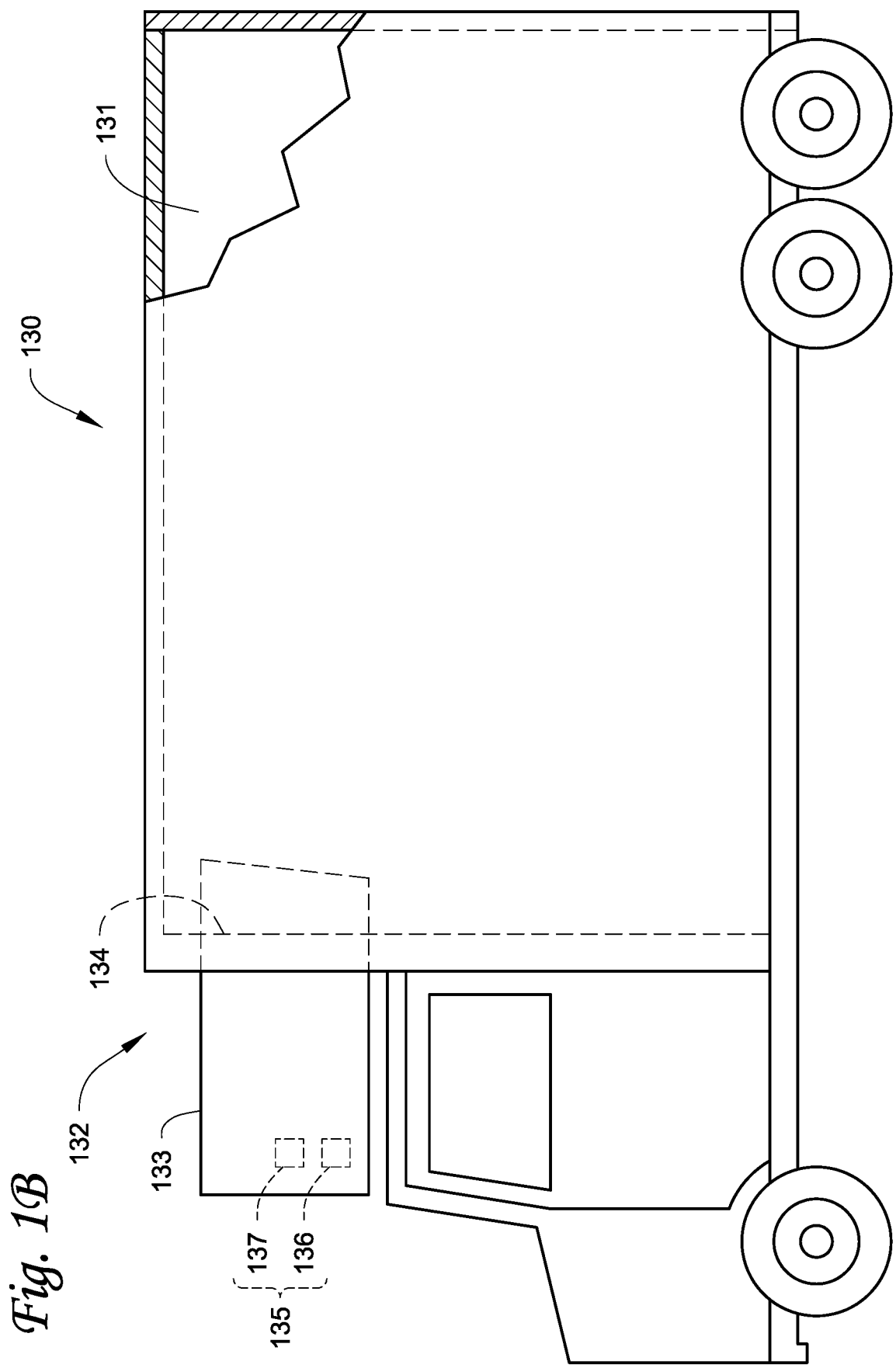

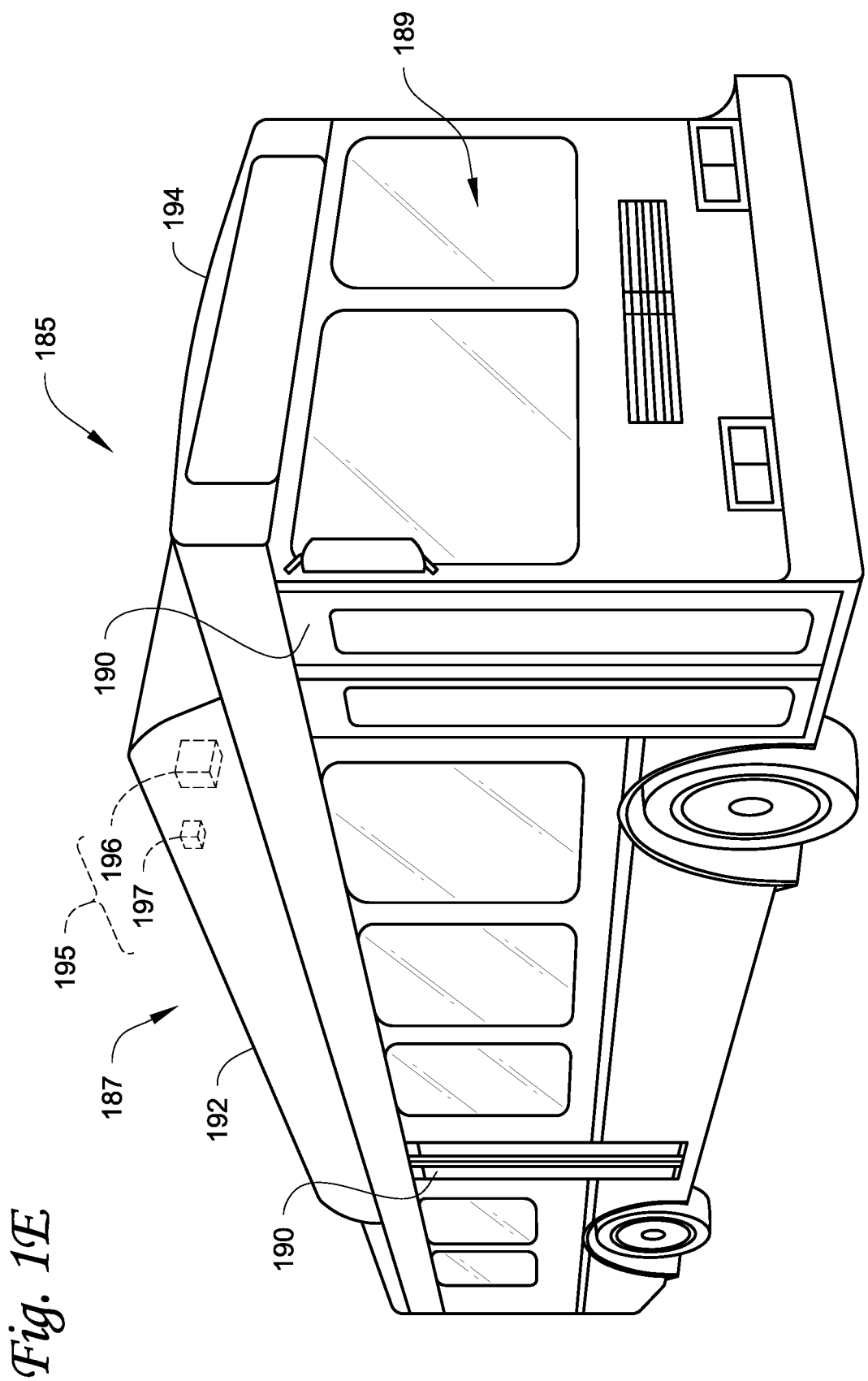

OPTIMIZED POWER CORD FOR TRANSFERRING POWER TO A TRANSPORT CLIMATE CONTROL SYSTEM

FIELD

The disclosure herein relates to an electrically powered accessory configured to be used with at least one of a vehicle, trailer, and a transport container. More particularly, the disclosure herein relates to an optimized power cord for transferring power to the electrically powered accessory.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

The embodiments disclosed herein relate to an electrically powered accessory configured to be used with at least one of a vehicle, trailer, and a transport container. More particularly, the embodiments disclosed herein relate to an optimized power cord for transferring power to the electrically powered accessory.

In particular, the embodiments described herein can provide an optimized power cord with a single plug at one end that can simultaneously provide both Alternating Current ("AC") and Direct Current ("DC") power to an electrically powered accessory configured to be used with at least one of a vehicle, trailer, and a transport container. Accordingly, the electrically powered accessory can simultaneously receive power from two separate power sources via the same plug of the optimized power cord. Thus, the number of power cords and necessary plugs required to be connected to the electrically powered accessory can be reduced to a single plug of a single optimized power cord. Also, the electrically powered accessory can include a single receptacle to receive both AC and DC power in parallel without requiring any changes to the electrically powered accessory.

In some embodiments, the electrically powered accessory can be a transport climate control unit that is part of a transport climate control system providing climate control within an internal space of a transport unit. Accordingly, the optimized power cord can simultaneously provide DC power that can be used, for example, for charging a rechargeable energy source of the transport climate control system and/or vehicle, and provide AC power that can be used, for example, for powering components (e.g., one or more compressors, one or more fans, one or more sensors, a controller, etc. of the transport climate control system. Thus, the number of power cords and necessary plugs required to be connected to the transport climate control unit can be reduced to a single plug of a single optimized power cord. Also, the transport climate control unit can receive both AC and DC power in parallel without requiring any substantial changes to the transport climate control unit.

In some embodiments, a second end of the optimized power cord can include two plugs that can connect to two different power sources (e.g., an AC power source and a DC power source). Accordingly, a first end of the power cord can be connected, via a single plug, to an electrically powered accessory and a second end of the optimized power cord can be connected to two separate and distinct power sources (e.g., an AC power source and a DC power source). When the electrically powered accessory is a transport climate control unit, the second end of the optimized power cord can include a first plug connected to a utility power source and a second plug connected to an electrical vehicle charging station.

In some embodiments, the single plug on the first end of the optimized power cord that can connect to a single receptacle of the electrically powered accessory includes an AC contact arrangement for supplying AC power from the optimized power cord to the electrically powered accessory, a DC contact arrangement for supplying DC power from the optimized power cord to the electrically powered accessory, and a communication contact arrangement for connecting and communicating with at least one of an AC power source and a DC power source. In some embodiments, the AC contact arrangement can supply three-phase AC power from the optimized power cord to the electrically powered accessory. In other embodiments, the AC contact arrangement can supply single phase AC power from the optimized power cord to the electrically powered accessory. In some embodiments, the single receptacle of the electrically powered accessory is configured to receive the AC contact arrangement, the DC contact arrangement, and the communication contact arrangement on the single plug of the optimized power cord.

In one embodiment, an optimized power cord for transferring power to an electrically powered accessory configured to be used with at least one of a vehicle, a trailer, and a transport container is provided. The optimized power cord includes a DC wire portion, an AC wire portion, and a single plug at a first end of the optimized power cord. The DC wire portion provides DC power to the electrically powered accessory. The DC wire portion has a first end and a second end. The AC wire portion provides AC power to the electrically powered accessory. The AC wire portion has a first end and a second end. The single plug at the first end of the optimized power cord is connected to the first end of the DC wire portion and connected to the first end of the AC wire portion. The single plug includes an AC contact arrangement for connecting to an AC power port of the electrically powered accessory, a DC contact arrangement for connecting to a DC power port of the electrically powered accessory, and a communication contact arrangement for connecting and communicating with at least one of an AC power source and a DC power source.

In another embodiment, an electrically powered accessory configured to be used with at least one of a vehicle, a trailer, and a transport container is provided. The electrically powered accessory includes an optimized power cord for transferring power to the electrically powered accessory from one of an external AC power source and an external DC power source. The optimized power cord includes a DC wire portion, an AC wire portion, and a single plug at a first end of the optimized power cord. The DC wire portion provides DC power to the electrically powered accessory. The DC wire portion has a first end and a second end. The AC wire portion provides AC power to the electrically powered accessory. The AC wire portion has a first end and a second end. The single plug is connected to the first end of the DC wire portion and connected to the first end of the AC wire portion. The single plug includes an AC contact arrangement for connecting to an AC power port of the electrically powered accessory, a DC contact arrangement for connecting to a DC power port of the electrically powered accessory, and a communication contact arrangement for connecting and communicating with at least one of an AC power source and a DC power source.

Other features and aspects will become apparent by consideration of the following detailed description and accompanying drawings.

BRIEF DESCRIPTION OF THE DRAWINGS

FIG. 1B illustrates a side view of a truck with a transport climate control system, according to one embodiment.

FIG. 1E illustrates a perspective view of a mass-transit vehicle including a transport climate control system, according to one embodiment.

Like reference numbers represent like parts throughout.

DETAILED DESCRIPTION

Figure 1A:
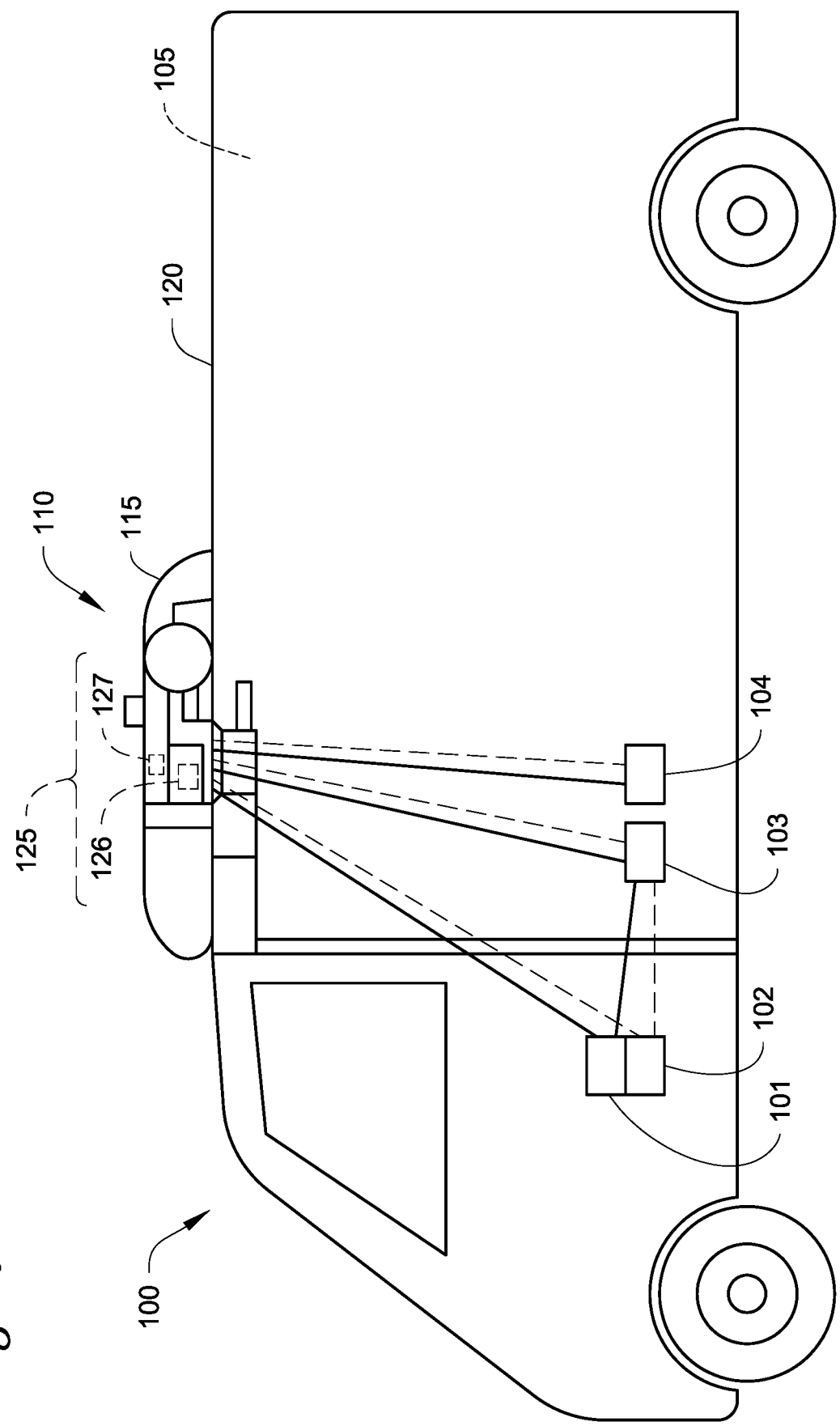
FIG. 1A illustrates a side view of a van with a transport climate control system, according to one embodiment.

The embodiments disclosed herein relate to an electrically powered accessory configured to be used with at least one of a vehicle, trailer, and a transport container. More particularly, the embodiments disclosed herein relate to an optimized power cord for transferring power to the electrically powered accessory.

The embodiments described herein can provide an optimized power cord with a single plug at one end that can simultaneously provide both AC and DC power to an electrically powered accessory configured to be used with at least one of a vehicle, trailer, and a transport container. Accordingly, the electrically powered accessory can simultaneously receive power from two separate power sources via the same plug of the optimized power cord. Thus, the number of power cords and necessary plugs required to be connected to the electrically powered accessory can be reduced to a single plug of a single optimized power cord. Also, the electrically powered accessory can receive both AC and DC power in parallel without requiring any changes to the electrically powered accessory.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565,110, "TRANSPORT CLIMATE CONTROL SYSTEM WITH A SELF-CONFIGURING MATRIX POWER CONVERTER,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORITIZED POWER DELIVERY FOR FACILITATING TRANSPORT CLIMATE CONTROL,"; U.S. application Ser. No. 16/565,205, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565, 235 "AN INTERFACE SYSTEM FOR CONNECTING A VEHICLE AND A TRANSPORT CLIMATE CONTROL SYSTEM,"; and U.S. application Ser. No. 16/565,252, "DEMAND-SIDE POWER DISTRIBUTION MANAGEMENT FOR A PLURALITY OF TRANSPORT CLIMATE CONTROL SYSTEMS,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 125 may comprise a single integrated control unit 126 or may comprise a distributed network of climate controller elements 126, 127. The number of distributed control elements in a given network can depend upon the particular application of the principles described herein.

Figure 2A:
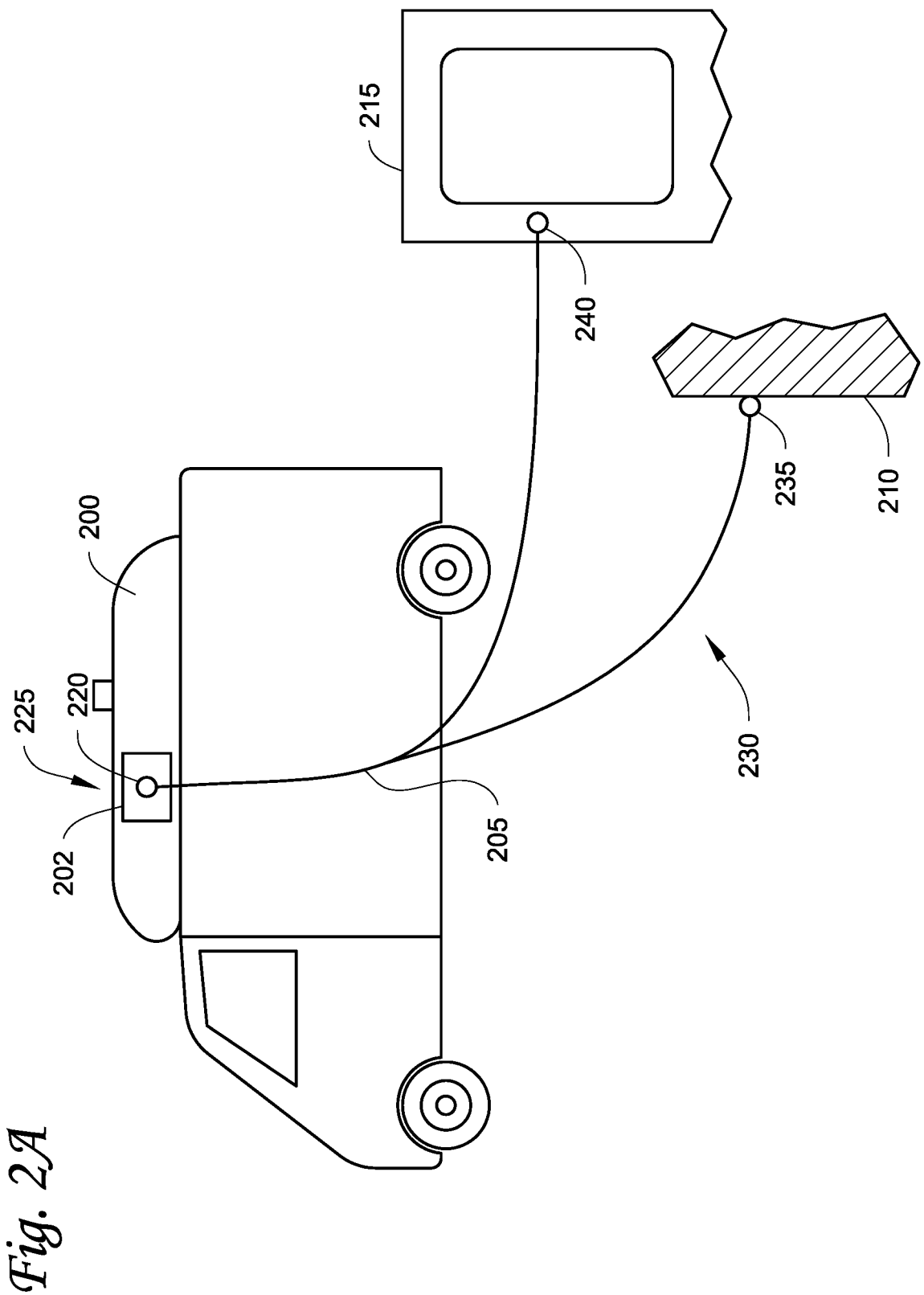
FIGS. 2A and 2B illustrate schematic diagrams of an electrically powered accessory that is connected to an AC power source and a DC power source via an optimized power cord, according to two different embodiments.
Figure 2B:
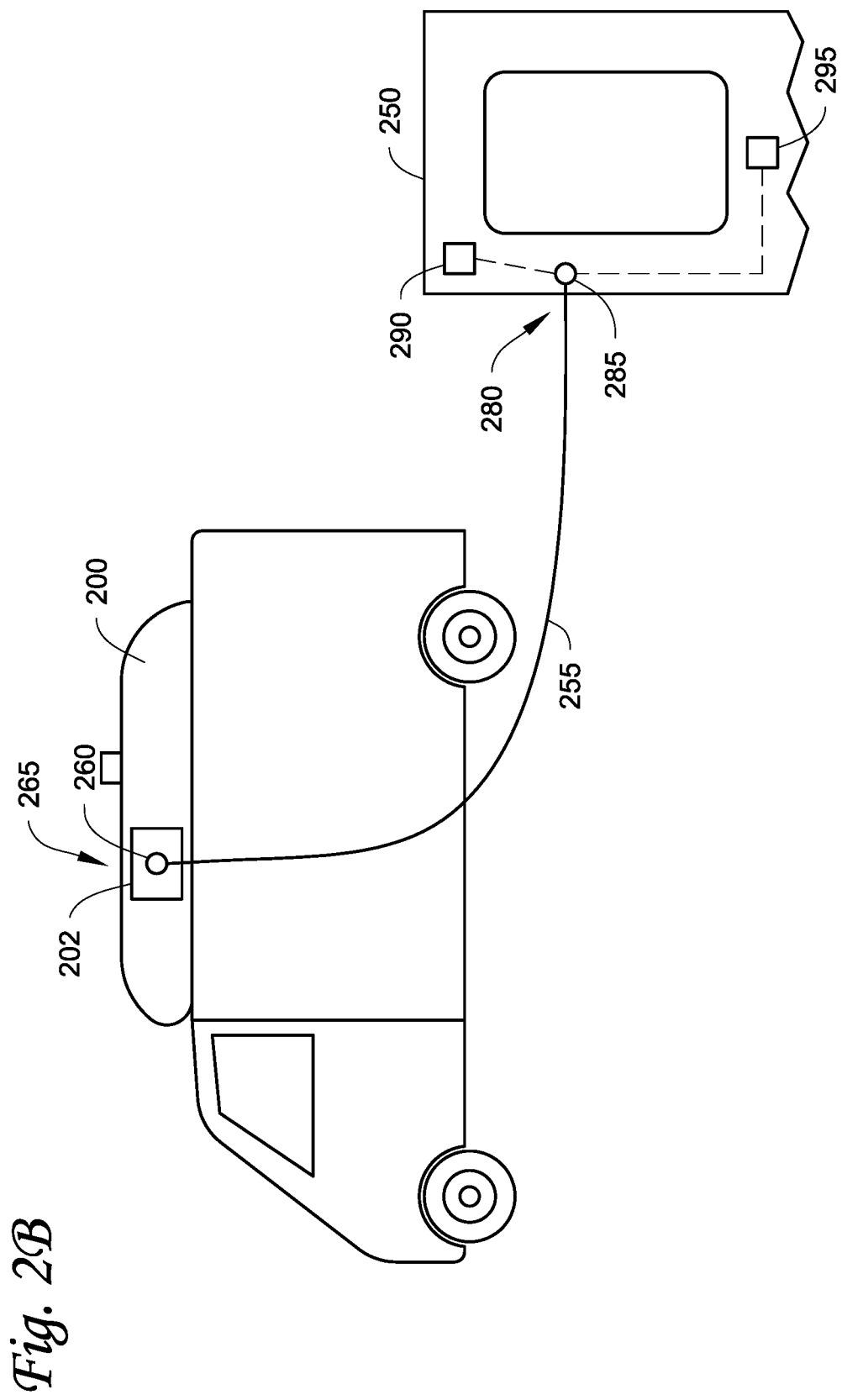
Figure 3A:
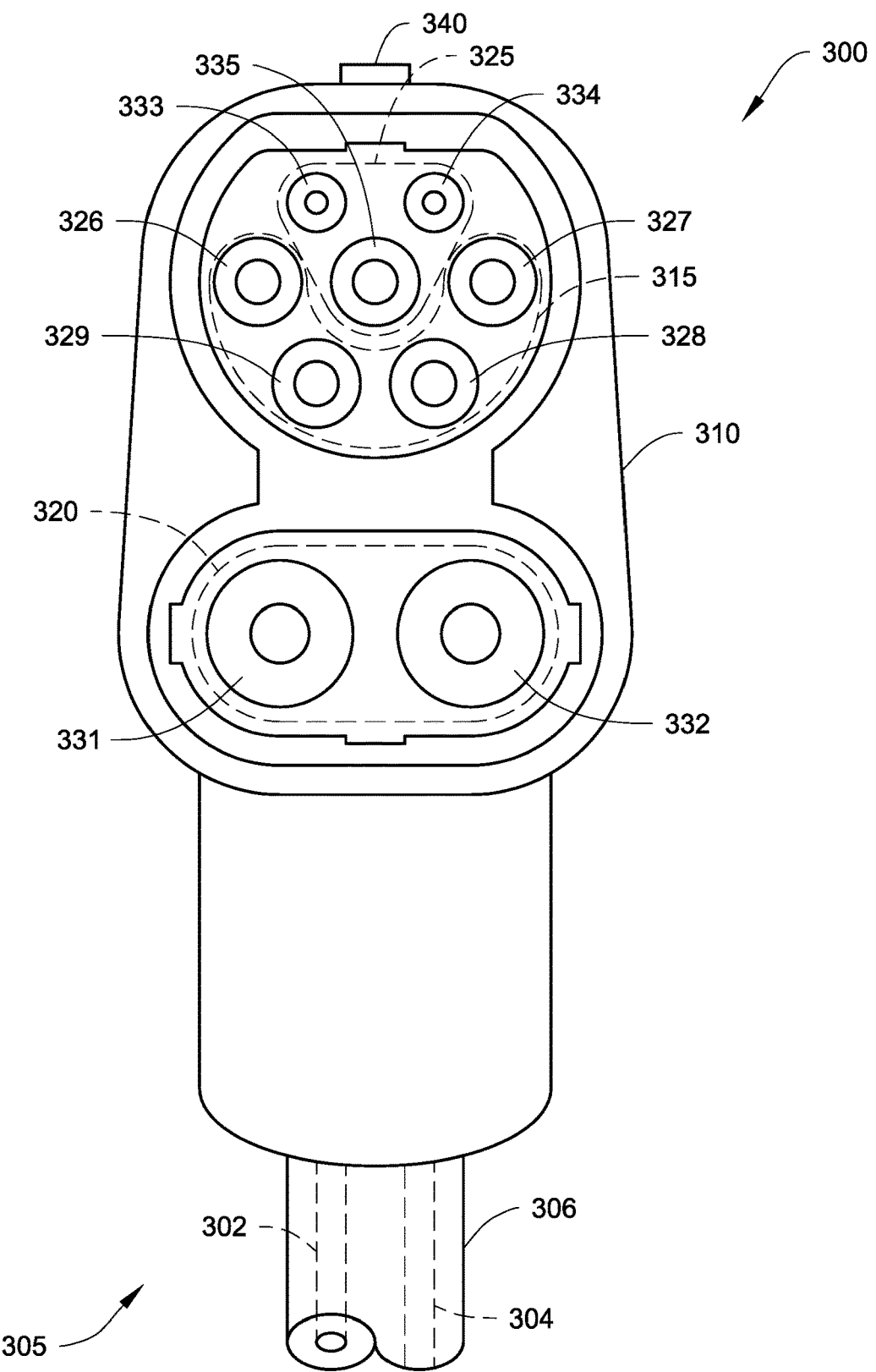
FIGS. 3A and 3B illustrate different embodiments of a first end of an optimized power cord.
Figure 3B:
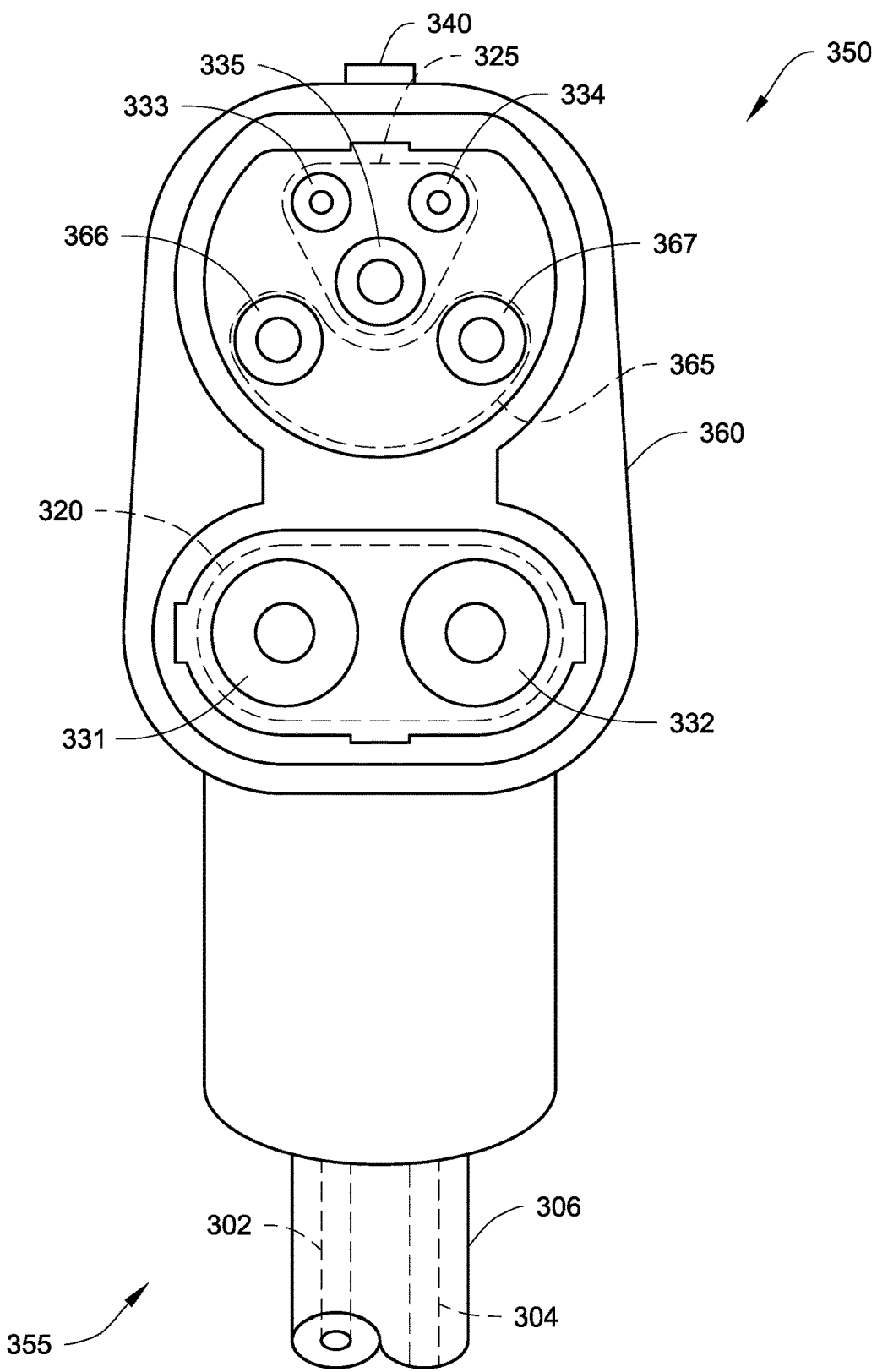

The climate-controlled van 100 can also include a vehicle PDU 101, a VES 102, a standard charging port 103, and/or an enhanced charging port 104 (see FIGS. 3A and 3B for the detailed description about the standard charging port and the enhanced charging port). The VES 102 can include a controller (not shown). The vehicle PDU 101 can include a controller (not shown). In one embodiment, the vehicle PDU controller can be a part of the VES controller or vice versa. In one embodiment, power can be distributed from e.g., an EVSE (not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103. See FIGS. 2, 3A, and 3B for a more detailed discussion of the ESE.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

Figure 1C:
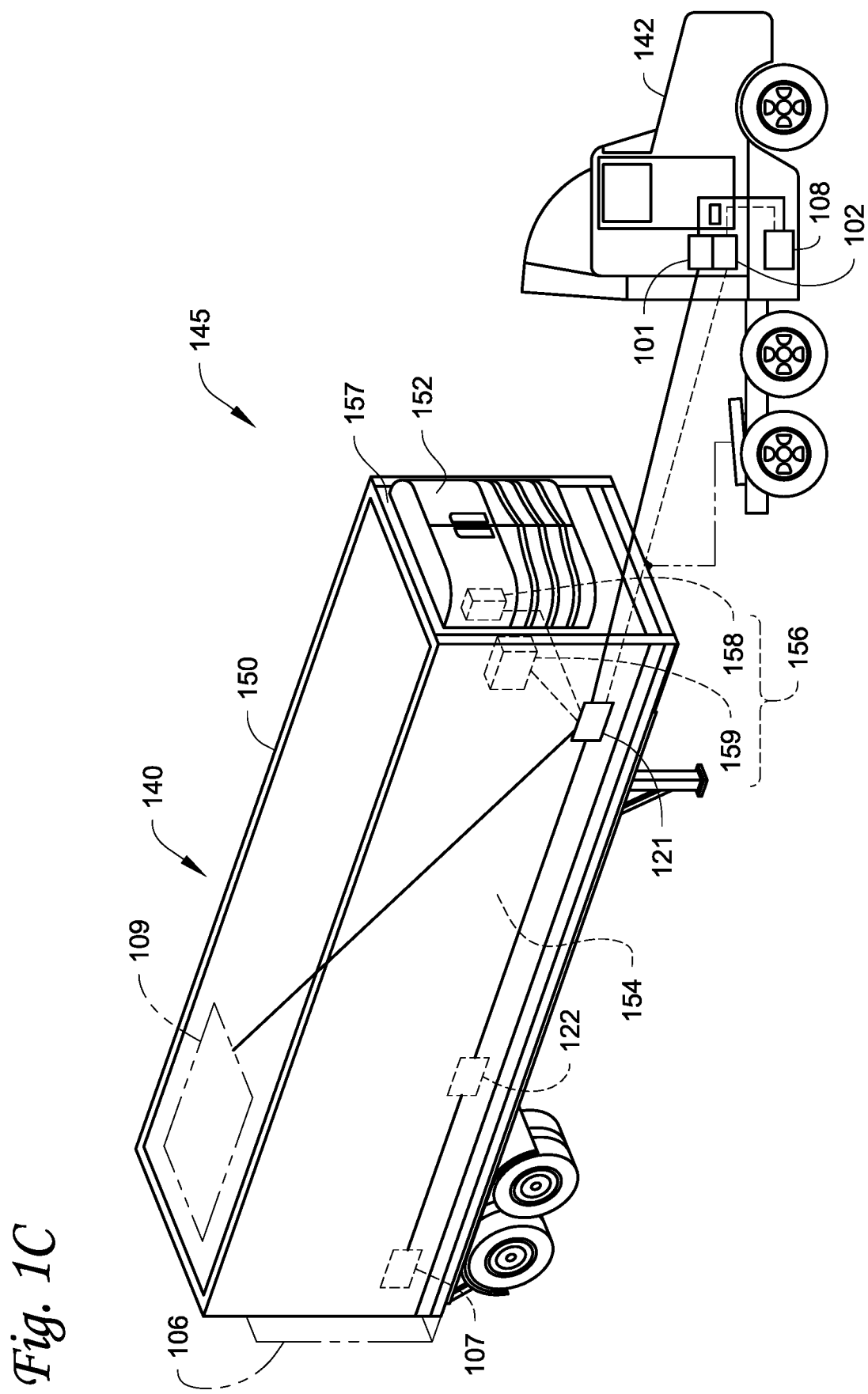
FIG. 1C illustrates a perspective view of a climate controlled transport unit, with a transport climate control system, attached to a tractor, according to one embodiment.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133. FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

Figure 1D:
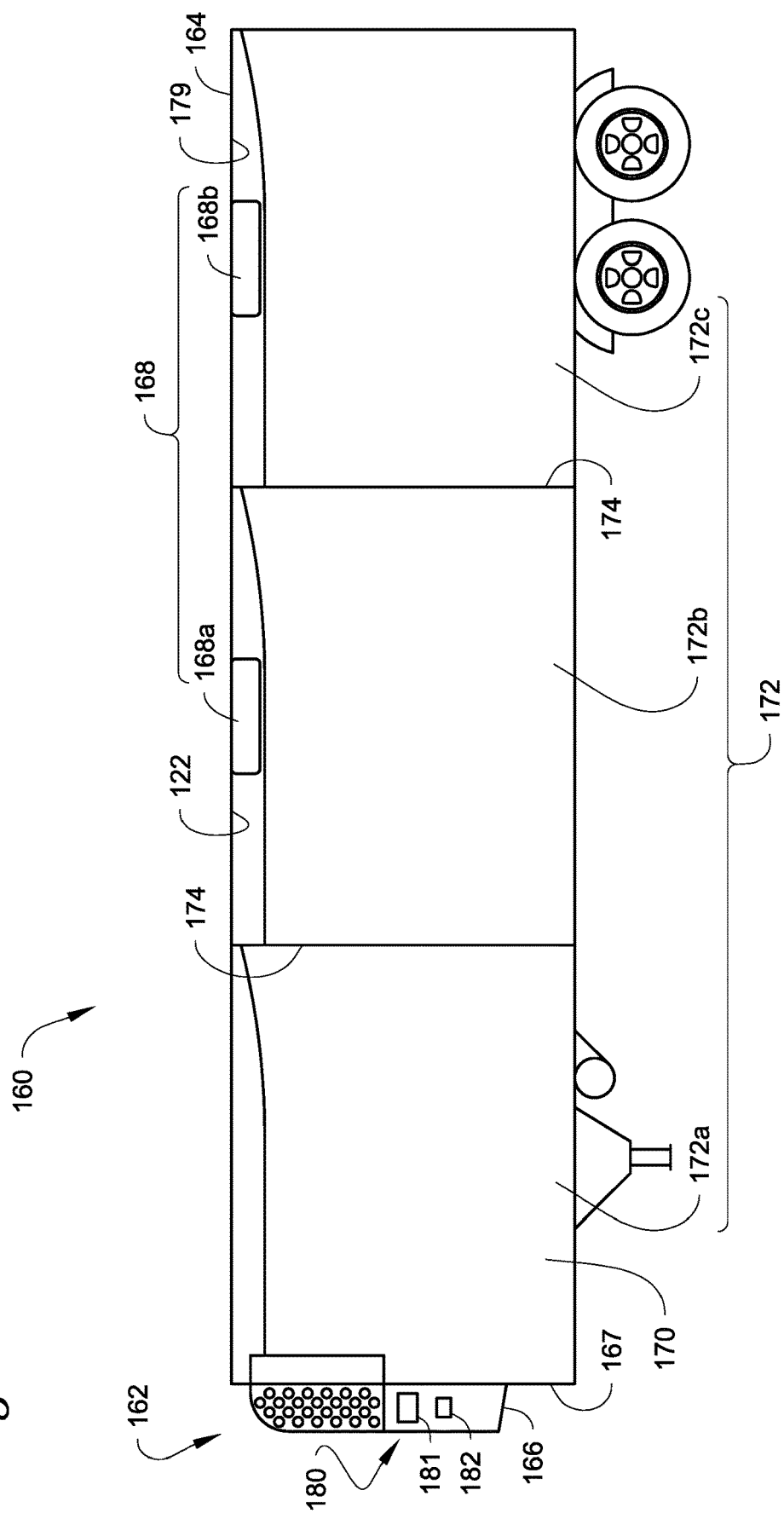
FIG. 1D illustrates a side view of a climate controlled transport unit with a multi-zone transport climate control system, according to one embodiment.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166. FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

In some embodiments, a CCU (e.g., the CCU 115, 133, 152, 166, 170) can be an electrically powered climate control unit. Also, in some embodiments, the CCU can include a rechargeable energy storage device (not shown) that can provide power to a transport climate control system (e.g., the transport climate control systems 110, 132, 145, 162, 187). In some embodiments, the rechargeable energy storage device can be charged by AC power (e.g., three-phase AC power, single phase AC power, etc.). In some embodiments, the rechargeable energy storage device can be charged by DC power. In some embodiments, components of the transport climate control system 110 (e.g., a compressor, one or more fans, one or more sensors, a controller, etc.) can require either AC power or DC power to operate. The CCU can include a receptacle (see FIG. 4) with an AC contact arrangement, a DC contact arrangement, and a communication contact arrangement for receiving a single plug at a first end of an optimized power cord. The second end of the optimized power cord have an AC plug that is connected to an AC power source and a DC plug that is connected to a DC power source that is separate from the AC power source. For example, in one embodiment, the AC power source can be a utility power source and the DC power source can be an electric vehicle charging station. In some embodiments, the AC plug at the second end of the optimized power cord can have a three-phase contact arrangement. In some embodiments, the AC plug at the second end of the optimized power cord can have a single-phase contact arrangement. An embodiment of an optimized power cord is shown below with respect to FIG. 3.

FIG. 2A illustrates a schematic diagram of a first embodiment of an electrically powered accessory 200 configured to be used with at least one of a vehicle, trailer, and a transport container that is connected to an AC power source 210 and a DC power source 215 via an optimized power cord 205. The electrically powered accessory 200 can be, for example, a CCU (e.g., the CCU115, 133, 152, 166, 170 shown in FIGS. 1A-E). The electrically powered accessory 200 includes a receptacle 202 for receiving the optimized power cord 205. In some embodiments, the receptacle 202 can be part of a power distribution unit (not shown) of the electrically powered accessory 200 that can distribute AC power and DC power to various components of the electrically powered accessory 200 including, for example, a rechargeable energy storage device (not shown). The power distribution unit may be electrically and/or communicatively connected between the AC power source 210 and the DC power source 215 at one end, and to the vehicle and/or to the CCU 200 at the other end. The structure and functionality of such a power distribution unit is described in more detail in U.S. application Ser. No. 16/565,205, "Transport Climate Control System with an Enhanced Power Distribution Unit for Managing Electrical Accessory Loads". One embodiment of the receptacle 200 is discussed below with respect to FIG. 4.

The AC power source 210 can be, for example, a utility power source. In some embodiments, the AC power source 210 can be a three-phase AC power source. In other embodiments, the AC power source 210 can be a single-phase power source. The DC power source 215 can be, for example, an electric vehicle charging station.

The optimized power cord 205 includes a first end 225 and a second end 230. The first end 225 of the optimized power cord 205 includes a single plug 220 that is connected to the receptacle 202 of the electrically powered accessory 200. The second end 230 of the optimized power cord 205 includes a first plug 235 that is connected to the AC power source 210 and includes a second plug 240 that is connected to the DC power source 215. Accordingly, the optimized power cord 205 can simultaneously provide both AC power and DC power from the AC power source 210 and the DC power source 215 to the electrically powered accessory 200 via a single plug 220 at the first end 225 of the optimized power cord 205. Details of the first end 225 of the optimized power cord 205 are described below with respect to FIGS. 3A and 3B. FIG. 2B illustrates a schematic diagram of a second embodiment of the electrically powered accessory 200 configured to be used with at least one of a vehicle, trailer, and a transport container that is connected to an electrical supply equipment (ESE) (e.g., electric vehicle charging station) 250 that includes both the AC power source 210 and the DC power source 215 via an optimized power cord 255. As noted above, the electrically powered accessory 200 can be, for example, a CCU (e.g., the CCU115, 133, 152, 166, 170 shown in FIGS. 1A-E). The electrically powered accessory 200 includes a receptacle 202 for receiving the optimized power cord 255. In some embodiments, the receptacle 202 can be part of a power distribution unit (not shown) of the electrically powered accessory 200 that can distribute AC power and DC power to various components of the electrically powered accessory 200 including, for example, a rechargeable energy storage device (not shown). One embodiment of the receptacle 200 is discussed below with respect to FIG. 4.

The optimized power cord 255 includes a first end 265 and a second end 270. The first end 265 of the optimized power cord 255 includes a single plug 260 that is connected to the receptacle 202 of the electrically powered accessory 200. The second end 280 of the optimized power cord 255 also includes a single plug 285 that is connected to the ESE 250. The ESE 250 can internally include an AC power source 290 and a DC power source 295. Accordingly, the optimized power cord 255 can simultaneously provide both AC power and DC power from the ESE 250 to the electrically powered accessory 200 via the single plug 260 at the first end 265 of the optimized power cord 255 and the single plug 285 at the second end 280 of the optimized power cord 255. Details of the first end 265 of the optimized power cord 255 are described below with respect to FIGS. 3A and 3B.

It will be appreciated that the optimized power cords 205, 255 can connect to the AC power source 210, the DC power source 215, and the ESE 250 using one or a combination of a Mode 1 charging mode, a Mode 2 charging mode, a Mode 3 charging mode, and a Mode 4 charging mode.

In the Mode 1 charging mode from IEC 62196, the AC power source 210 and/or the ESE 250 can include a normal AC receptacle accepting, for example, a NEMA 16-20P plug, and provides no communication with the electrically powered accessory 200.

In the Mode 2 charging mode, the AC power source 210 and/or the ESE 250 can include a normal AC receptacle accepting, for example, NEMA 15-50P, and the optimized power cords 205, 255 can include communication with the electrically powered accessory.

In the Mode 3 charging mode, the AC power source 210 and/or the ESE 250 can be an AC pedestal or wall mount EVSE with the second end 230, 280 permanently affixed to the AC power source 210 and/or the ESE 250.

In the Mode 4 charging mode from IEC 62196, the DC power source 215 and/or the ESE 250 can provide DC charging with the second end 230, 280 permanently affixed to the DC power source 215 and/or the ESE 250.

It will also be appreciated that the optimized power cords 205, 255 can concurrently connect a vehicle electrical system of the vehicle and/or the electrically powered accessory 200 to both the AC power source 210 and the DC power source 215 or to the ESE 250 at the same. Accordingly, a rechargeable energy storage device of the electrically powered accessory 200 can be simultaneously connected to the DC power source 215, 295 and a vehicle electrical system of the vehicle can be connected to the AC power source 210, 290 via the same optimized power cord 205, 255. Also, a rechargeable energy storage device of the electrically powered accessory 200 can be simultaneously connected to the DC power source 215, 295 and a vehicle electrical system of the vehicle can be connected to the DC power source 215, 295 via the same optimized power cord 205, 255.

FIG. 3A illustrates a first end 305 of an optimized power cord 300 (e.g., the first ends 225, 265 of the optimized power cords 205, 255 shown in FIGS. 2A and 2B), according to a first embodiment. The optimized power cord 300 includes an AC wire portion 302, a DC wire portion 304, and a single plug 310 at the first end 305. The AC wire portion 302 transfers three-phase or single-phase AC power through the optimized power cord 300. The DC wire portion 304 transfers DC power through the optimized power cord 300. The AC wire portion 302 and the DC wire portion 304 are bundled together within a single cable sheath 306 through the first end 305 of the optimized power cable 300 up to the single plug 310. The single plug 310 is connected to a first end of the AC wire portion 302 and a first end of the DC wire portion 304. The single plug 310 includes an AC contact arrangement 315, a DC contact arrangement 320, and a communication contact arrangement 325. The first end 305 of the optimized power cord 300 is configured to connect to an electrically powered accessory (e.g., the CCU 115, 133, 152, 166, 170 shown in FIGS. 1A-E and the electrically powered accessory 200 shown in FIG. 2) configured to be used with at least one of a vehicle, trailer, and a transport container.

The AC contact arrangement 315 can be configured to transfer three-phase AC power or single-phase AC power out of the optimized power cord 300. The AC contact arrangement 315 includes a neutral contact 326 and line phase contacts 327, 328, 329, with each of the contacts 327, 328, 329 supplying a separate line phase of a three-phase AC power. When the AC contact arrangement 315 is supplying single-phase AC power, only the neutral contact 326 and one of the line phase contacts 327, 328, 329 (e.g., line phase contact 327) may be used.

The DC contact arrangement 320 can be configured to transfer DC power out of the optimized power cord 300. The DC contact arrangement 320 includes a positive DC contact 331 and a negative DC contact 332.

The communication contact arrangement 325 can be configured to communicate with the electrically powered accessory. The communication contact arrangement 325 includes a control pilot contact 333 that provides post-insertion signaling, a proximity pilot contact 334 that provides post-insertion signaling, and a protective earth contact 335 that can provide a full-current protective earthing system. The protective earth contact 335 is a safety feature that can reduce electric shock potential when, for example, there is a faulty connection.

FIG. 3B illustrates a first end 355 of an optimized power cord 350, according to a second embodiment. The optimized power cord 350 includes an AC wire portion 302, a DC wire portion 304, and a single plug 360 at the first end 355. The AC wire portion 302 can transfer single-phase AC power through the optimized power cord 350. The DC wire portion 304 transfers DC power through the optimized power cord 350. The AC wire portion 302 and the DC wire portion 304 are bundled together within a single cable sheath 306 through the first end 355 of the optimized power cable 350 up to the single plug 360. The single plug 360 is connected to a first end of the AC wire portion 302 and a first end of the DC wire portion 304. The single plug 360 includes a single-phase AC contact arrangement 365, a DC contact arrangement 320, and a communication contact arrangement 325. The first end 355 of the optimized power cord 350 is configured to connect to an electrically powered accessory (e.g., the CCU 115, 133, 152, 166, 170 shown in FIGS. 1A-E and the electrically powered accessory 200 shown in FIG. 2).

The single-phase AC contact arrangement 365 can be configured to transfer single-phase AC power out of the optimized power cord 350. The single-phase AC contact arrangement 365 includes a neutral contact 366 and a line contact 367 supplying a line phase of a single-phase AC power.

The DC contact arrangement 320 can be configured to transfer DC power out of the optimized power cord 350. The DC contact arrangement 320 includes a positive DC contact 331 and a negative DC contact 332.

The communication contact arrangement 325 can be configured to communicate with the electrically powered accessory. The communication contact arrangement 325 includes a control pilot contact 333 that provides post-insertion signaling, a proximity pilot contact 334 that provides post-insertion signaling, and a protective earth contact 335 that can provide a full-current protective earthing system.

It will be appreciated that while the optimized power cords 300, 350 are shown using a Type 2 combo configuration reflecting VDE-AR-E 2623-2-2 plug specifications, it will be appreciated that in other embodiments the optimized power cords 300, 350 can use a Type 3 combo configuration reflecting EV Plug Alliance specifications and/or a fast charge coupler configuration reflecting, for example, CHAdeMO specifications. Also, in some embodiments, the optimized power cord 350 can use a Type 1 combo configuration reflecting SAE J1772/2009 automotive plug specifications.

Figure 4:
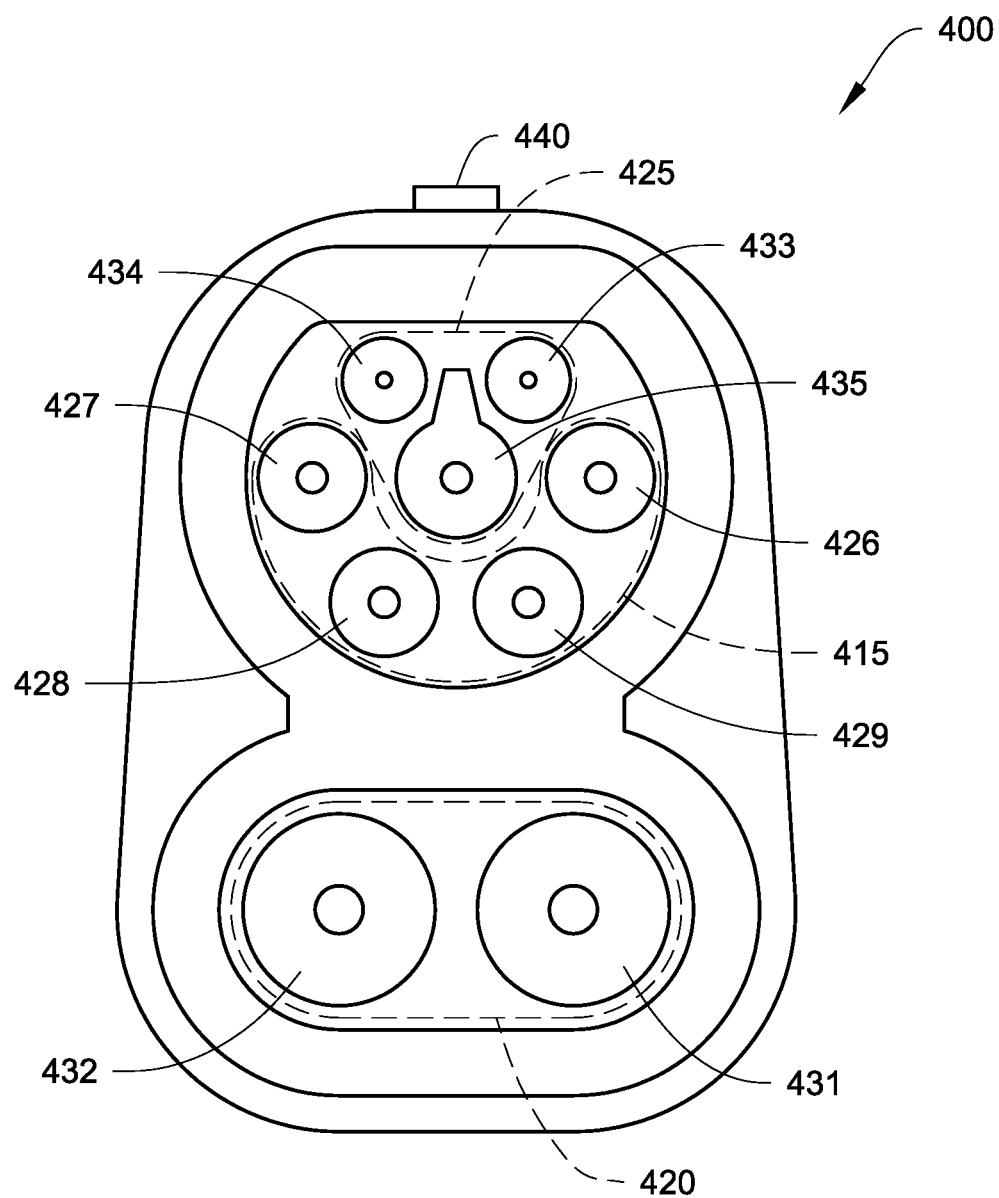
FIG. 4 illustrates a receptacle of an electrically powered accessory, according to one embodiment.

The optimized power cords 300, 350 also include an unlock tab 340 that is configured to allow a user to detach the optimized power cord 300, 350 from a receptacle (e.g., the receptacle 400 shown in FIG. 4).

FIG. 4 illustrates one embodiment of a receptacle 400 of an electrically powered accessory (e.g., the CCU 115, 133, 152, 166, 170 shown in FIGS. 1A-E and the electrically powered accessory 200 shown in FIG. 2) configured to be used with at least one of a vehicle, trailer, and a transport container.

In some embodiments, the receptacle 400 can be part of a power distribution unit (not shown) of an electrically powered accessory (e.g., the electrically powered accessory 200 shown in FIG. 2) that can distribute AC power and DC power to various components of the electrically powered accessory including, for example, a rechargeable energy storage device (not shown). The receptacle 400 is configured to receive a single plug (e.g., the single plug 310, 360 shown in FIGS. 3A and 3B) of an optimized power cord (e.g., the optimized power cord 300, 350 shown in FIGS. 3A and 3B).

The receptacle 400 includes an AC contact arrangement 415, a DC contact arrangement 420, and a communication contact arrangement 425.

The AC contact arrangement 415 can be configured to receive three-phase AC power or single-phase AC power from an optimized power cord (e.g., the optimized power cords 300, 350 shown in FIGS. 3A and 3B). The AC contact arrangement 415 includes a neutral contact 426 and line phase contacts 427, 428, 429, with each of the contacts 427, 428, 429 receiving a separate line phase of a three-phase AC power. When the AC contact arrangement 415 is receiving single-phase AC power, only the neutral contact 426 and one of the line phase contacts 427, 428, 429 (e.g., the line phase contact 427) may be used. Also, in some embodiments, when the AC contact arrangement 415 is receiving single-phase AC power, the receptacle 400 can be adapted to not include the line phase contacts 427, 428, 429 not being used (e.g., the line phase contacts 428, 429). The neutral contact 426 is configured to connect with a neutral contact (e.g., the neutral contact 326, 366 shown in FIGS. 3A and 3B) of an optimized power cord. Each of the line phase contacts 427, 428, 429 is configured to connect with a line phase contact 327, 328, 329 of an optimized power cord.

The DC contact arrangement 420 can be configured to receive DC power from an optimized power cord. The DC contact arrangement 420 includes a positive DC contact 431 and a negative DC contact 432. The positive DC contact 431 is configured to connect with a positive DC contact (e.g., the positive DC contact 331 shown in FIGS. 3A and 3B) of an optimized power cord. The negative DC contact 432 is configured to connect with a negative DC contact (e.g., the negative DC negative contact 332 shown in FIGS. 3A and 3B) of an optimized power cord.

The communication contact arrangement 425 can be configured to communicate with the electrically powered accessory. The communication contact arrangement 425 includes a control pilot contact 433 that provides post-insertion signaling, a proximity pilot contact 434 that provides post-insertion signaling, and a protective earth contact 435 that can provide a full-current protective earthing system. The control pilot contact 433 is configured to connect with a control pilot contact (e.g., the control pilot contact 433 shown in FIGS. 3A and 3B) of an optimized power cord. The proximity pilot contact 434 is configured to connect with a proximity pilot contact (e.g., the proximity pilot contact 434 shown in FIGS. 3A and 3B) of an optimized power cord. The protective earth contact 435 is configured to connect with a protective earth contact (e.g., the protective earth contact 435 shown in FIGS. 3A and 3B) of an optimized power cord.

The configuration of the receptacle 400 allows the electrically powered accessory to simultaneously receive AC power from an AC power source and DC power from a DC source from a single plug of an optimized power cord.

It will be appreciated that while the receptacle 400 is shown to accept a Type 2 combo plug configuration reflecting VDE-AR-E 2623-2-2 plug specifications, it will be appreciated that in other embodiments the receptacle 400 can be modified to accept a Type 3 combo plug configuration reflecting EV Plug Alliance specifications and/or a fast charge coupler plug configuration reflecting, for example, CHAdeMO specifications. Also, in some embodiments, the receptacle 400 can be modified to accept a Type 1 combo configuration reflecting SAE J1772/2009 automotive plug specifications.

Figure 5:
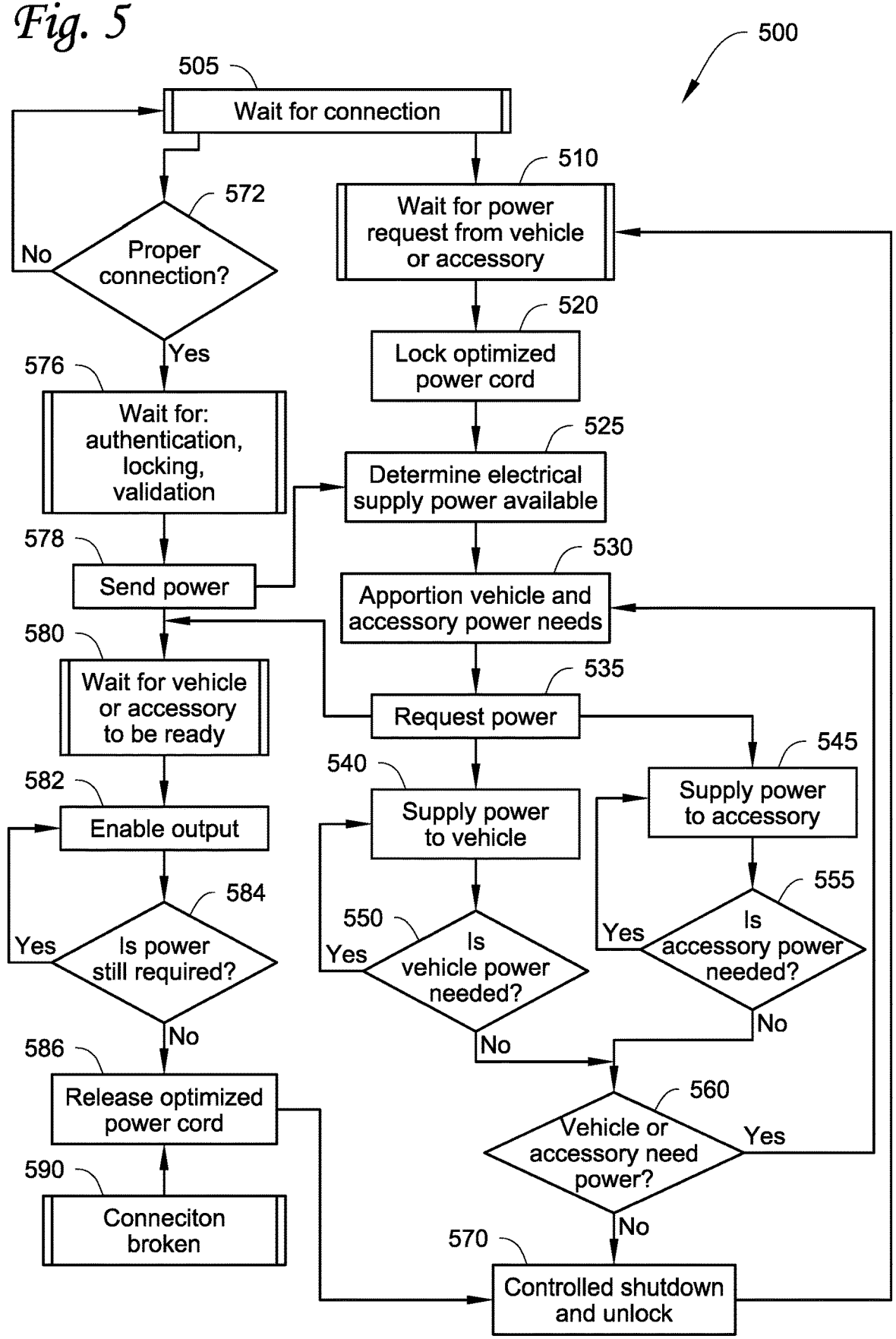
FIG. 5 illustrates a flowchart of a method for transferring power to an electrically powered accessory, according to one embodiment.

The receptacle 400 also includes a latch mechanism 440 that is configured to lock the single plug when connected to the receptacle 400. In some embodiments, the latch mechanism 440 is a motorized device that physically obstructs an unlock tab (e.g., the unlock tab 340 shown in FIGS. 3A and 3B) of the single plug when the single plug is connected to the receptacle 400 as a safety feature to prevent a user from removing the single plug from the receptacle 400 until it is safe to do so. FIG. 5 illustrates a flowchart of a method 500 for transferring power to an electrically powered accessory (e.g., the CCU 115, 133, 152, 166, 170 shown in FIGS. 1A-E and the electrically powered accessory 200 shown in FIG. 2), according to one embodiment. The method 500 allows for proper communication between an ESE and both a vehicle and the electrically powered accessory. In particular, a controller of a vehicle and/or electrically powered accessory can communicate to an ESE controller of the ESE via the optimized power cord and the ESE controller can be provided with information to authenticate both the vehicle and the electrically powered accessory to receive power from the ESE.

The method 500 begins at 505, whereby the controller (e.g., the controller 125, 135, 156, 180, 195 shown in FIGS. 1A-3) of a vehicle and/or electrically powered accessory waits until the vehicle and/or electrically powered accessory is connected to an ESE via an optimized power cord (e.g., the optimized power cords 205, 255, 300 and 350 shown in FIGS. 2A, 2B, 3A and 3B) being connected to a receptacle of the vehicle and/or electrically powered accessory (e.g., the receptacle 400 shown in FIG. 4). When the controller determines that the vehicle and/or electrically powered accessory is connected to the ESE via the optimized power cord, the method 500 proceeds concurrently to 510 and 572.

At 510, the controller determines waits for the vehicle and/or the electrically powered accessory to request power from the ESE. When the vehicle and/or electrically powered accessory requests power from the ESE, the method 500 proceeds to 520.

At 520, the controller locks the optimized power cord plug to the receptacle. In some embodiments, the controller can instruct a latch mechanism (e.g., the latch mechanism 440 shown in FIG. 4) to physically obstruct an unlock tab (e.g., the unlock tab 340 shown in FIGS. 3A and 3B) of the optimized power cord. This provides a safety feature that can prevent a user from removing the optimized power cord from the receptacle. The controller can also send a signal to an ESE controller that the optimized power cord is secured locked to the receptacle. The method 500 then proceeds to 525, 530 and 576.

At 525, the controller determines whether the power from the ESE is sufficient for the power requirements of the vehicle and/or the electrically powered accessory based on, for example, the power received at 578. When the controller determines that the power from the ESE is sufficient, the method 500 proceeds to 535.

At 530, the controller apportions power from the ESE to the vehicle and/or the electrically powered accessory based on the requests received at 510. In some embodiments, when the controller determines that there is insufficient power at the ESE to meet the power request of the vehicle and/or the electrically powered accessory, the controller can send a notification to the user that the ESE may not be capable of providing sufficient power for the vehicle and/or the electrically powered accessory. The controller may also request a corrective action from the user based on the power deficiency. The method 500 then proceeds to 535.

At 535, the controller requests power from the ESE via a ready signal sent through a proximity pilot contact and a protection earth contact (e.g., the control pilot contact 333 and the protective earth contact 335 shown in FIGS. 3A and 3B) of an optimized power cord. In some embodiments, the signal can be, for example, a 6 volt signal from the vehicle and/or the electrical accessory to the ESE. The method 500 then proceeds concurrently to 540 and 545.

At 540, the ESE supplies power to the vehicle via the optimized power cord. That is, power received at the receptacle is distributed to the vehicle based on the apportionment determined at 530. At 550, the controller determines whether power for the vehicle is still required from the ESE. When power is still required, the method 500 proceeds back to 540. When power is no longer required, the method 500 proceeds to 560.

At 545, the ESE supplies power to the electrically powered accessory via the optimized power cord. That is, power received at the receptacle is distributed to the electrically powered accessory based on the apportionment determined at 530. The method 500 then proceeds to 555.

At 555, the controller determines whether power for the electrically powered accessory is still required from the ESE. When power is still required, the method 500 proceeds back to 545. When power is no longer required, the method 500 proceeds to 560.

At 560, the controller determines whether the power request at 510 has been satisfied for both of the vehicle and the electrically powered accessory. If the power request has been satisfied (neither the vehicle nor the electrically powered accessory require power from the ESE), the method proceeds to 570. If the power request has not been satisfied (one of the vehicle and/or the electrically powered accessory still requires power from the ESE), the method returns to 530.

Details regarding energy management for the electrically powered accessory from the ESE for 525, 530, 535, 540, 545, 550, 555 and 560 is described in more detail in U.S. application Ser. No. 16/565,235, "Method for Providing TRU Energy Needs During All EV Operational Modes", filed concurrently herewith on Sep. 9, 2019, and the contents of which are incorporated herein by reference.

At 570, the controller instructs a controlled shutdown for the connection between the ESE and the vehicle via the optimized power cord upon receiving an unlatch signal (e.g., via the proximity pilt contacts 334, 434 and the protective earth contacts 335, 435 shown in FIGS. 3A, 3B and 4) from the ESE controller. Accordingly, the user can safely disconnect the optimized power cord from the receptacle. The method 500 then proceeds back to 510.

At 572, an ESE controller determines whether there is a proper connection between the optimized power cord and the vehicle/electrically powered accessory. In some embodiments, the ESE controller determines that there is a proper connection when signals are able to pass successfully between the ESE and the vehicle/electrically powered accessory via the proximity pilot contact and/or the protection earth contact. When the ESE controller determines that a proper connection is made, the method 500 proceeds to 576. Otherwise, the ESE controller can provide a status notification (e.g., via a short message service (SMS) message, a message displayed at the ESE, an email, etc.) to the user that an improper connection has been made and the method 500 returns to 505.

At 576, the ESE controller waits for the vehicle/electrically powered accessory to be authenticated, the optimized power cord to be locked to the receptacle, and the vehicle/electrically powered accessory to be valid to receive power from a power supply of the ESE. The ESE controller can determine that the vehicle/electrically powered accessory is authenticated based on whether the vehicle/electrically powered accessory is permitted to use the ESE (e.g., the user has paid to use the ESE, has provided an authorized card and/or code, etc.) and/or the vehicle/electrically powered accessory has an appropriate load to match the power provided by the ESE. The ESE controller can determine whether the optimized power cord is securely locked to the receptacle based on, for example, a signal sent from the controller of the vehicle and/or electrically powered accessory at 520. The ESE controller can determine that the vehicle/electrically powered accessory is valid to receive power from the power supply of the ESE based on communication signals sent via a protective earth contact and/or a proximity pilot contact of a communication contact arrangement of the optimized power cord and the receptacle (e.g., the proximity pilot contacts 334, 434, the protective earth contacts 335, 435 and the communication contact arrangements 325, 425 shown in FIGS. 3A, 3B and 4). When the ESE controller determines that the vehicle/electrically powered accessory is authenticated, the optimized power cord is locked to the receptacle, and the vehicle/electrically powered accessory is valid to receive power from a power supply of the ESE, the method 500 then proceeds to 578. It will be appreciated that while the ESE controller waits, the ESE controller can send notification updates to the user (e.g., via SMS message, a message displayed on the ESE, an email message, etc.) indicating the status of the connection.

At 578, the ESE controller instructs the ESE to supply power to the vehicle and/or electrically powered accessory. In some embodiments, the power sent to from the ESE to the vehicle/electrically powered accessory can be via a pulse width modulation ("PWM") power signal. The method 500 then proceeds concurrently to 580 and 525.

At 580, the ESE controller waits until the vehicle/electrically powered accessory is ready for receiving power. In some embodiments, the ESE controller can determine that the vehicle/electrically powered accessory is ready when the ESE controller receives the ready signal (e.g., via the control pilot contacts 333, 433 and the protective earth contacts 335, 435 shown in FIGS. 3A, 3B and 4) sent at 535.

At 582, the ESE supplies power to one or more of the vehicle and/or the electrically powered accessory. At 584, the ESE controller determines whether power for the vehicle and/or electrically powered accessory is still required from the ESE. When power is still required, the method 500 proceeds back to 582. When power is no longer required, the method 500 proceeds to 586.

At 586, the ESE controller instructs the latch mechanism to no longer physically obstruct the unlock tab of the optimized power cord and sends an unlatch signal (e.g., via the proximity pilot contacts 334, 434 and the protective earth contacts 335, 435 shown in FIGS. 3A, 3B and 4) to the controller of the vehicle/electrically powered accessory. The method 500 then proceeds to 570.

It will be appreciated that the ESE controller also monitors the proximity pilot contacts, the control pilot contacts and the protective earth contacts of the optimized power cord and the receptacle to ensure that a proper connection is made at 590. At any point the ESE controller determines that a combination of the proximity pilot contacts and the protective earth contacts or the control pilot contacts and the protective earth contacts are no longer capable of sending signals via the optimized power cord and the receptacle, the ESE controller determines that the connection between the ESE and the vehicle/electrically powered accessory is broken and sends a notification to the user (e.g., via a SMS message, a message displayed on the ESE, an email message, etc.). The method 500 then proceeds to 586.

Aspects:

Any of aspects 1-8 can be combined with any of aspects 9-16.

Aspect 1. An optimized power cord for transferring power to an electrically powered accessory configured to be used with at least one of a vehicle, a trailer, and a transport container, the optimized power cord comprising:
  a DC wire portion to provide DC power to the electrically powered accessory, the DC wire portion having a first end and a second end;
  an AC wire portion to provide AC power to the electrically powered accessory, the AC wire portion having a first end and a second end;
  a single plug at a first end of the optimized power cord that is connected to the first end of the DC wire portion and connected to the first end of the AC wire portion, the single plug including:
    an AC contact arrangement for connecting to an AC power port of the electrically powered accessory,
    a DC contact arrangement for connecting to a DC power port of the electrically powered accessory, and
    a communication contact arrangement for connecting and communicating with at least one of an AC power source and a DC power source.

Aspect 2. The optimized power cord of aspect 1, further comprising:
  an AC wire plug connected to the second end of the AC wire portion for connecting the optimized power cord to the AC power source; and
  a DC wire plug connected to the second end of the DC wire portion for connecting the optimized power cord to the DC power source.

Aspect 3. The optimized power cord of either one of aspects 1 and 2, wherein the AC contact arrangement is a three-phase AC contact arrangement that includes a first line phase contact for distributing first phase AC power, a second line phase contact for distributing second phase AC power, a third line phase contact for distributing third phase AC power, and a neutral contact.

Aspect 4. The optimized power cord of either one of aspects 1 and 2, wherein the AC contact arrangement is a single-phase AC contact arrangement that includes a line contact for distributing single phase AC power, and a neutral contact.

Aspect 5. The optimized power cord of any of aspects 1-4, wherein the AC wire portion and the DC wire portion are bundled together within a single cable sheath.

Aspect 6. The optimized power cord of any of aspects 1-5, wherein the DC wire portion is configured to provide DC power for charging an electrically powered accessory electrical storage device of the electrically powered accessory.

Aspect 7. The optimized power cord of any of aspects 1-6, wherein the AC wire portion is configured to provide AC power for operating the electrically powered accessory.

Aspect 8. The optimized power cord of any of aspects 1-7, wherein the AC wire portion is configured to provide AC power for charging an electrically powered accessory electrical storage device of the electrically powered accessory.

Aspect 9. An electrically powered accessory configured to be used with at least one of a vehicle, a trailer, and a transport container, the electrically powered accessory comprising:
  an optimized power cord for transferring power to the electrically powered accessory from one of an external AC power source and an external DC power source, the optimized power cord including:
    a DC wire portion to provide DC power to the electrically powered accessory, the DC wire portion having a first end and a second end;
    an AC wire portion to provide AC power to the electrically powered accessory, the AC wire portion having a first end and a second end;
    a single plug at a first end of the optimized power cord that is connected to the first end of the DC wire portion and connected to the first end of the AC wire portion, the single plug including:
      an AC contact arrangement for connecting to an AC power port of the electrically powered accessory,
      a DC contact arrangement for connecting to a DC power port of the electrically powered accessory, and
      a communication contact arrangement for connecting and communicating with at least one of an AC power source and a DC power source.

Aspect 10. The electrically powered accessory of aspect 9, wherein the optimized power cord further includes:
an AC wire plug connected to the second end of the AC wire portion for connecting the optimized power cord to the AC power source; and
a DC wire plug connected to the second end of the DC wire portion for connecting the optimized power cord to the DC power source.

Aspect 11. The electrically powered accessory of either one of aspects 9 and 10, wherein the AC contact arrangement is a three-phase AC contact arrangement that includes a first line phase contact for distributing first phase AC power, a second line phase contact for distributing second phase AC power, a third line phase contact for distributing third phase AC power, and a neutral contact.

Aspect 12. The electrically powered accessory of either one of aspects 9-10, wherein the AC contact arrangement is a single-phase AC contact arrangement that includes a line contact for distributing single phase AC power, and a neutral contact.

Aspect 13. The electrically powered accessory of any of aspects 9-12, wherein the AC wire portion and the DC wire portion are bundled together within a single cable sheath.

Aspect 14. The electrically powered accessory of any of aspects 9-13, further comprising an electrical storage device, and wherein the DC wire portion is configured to provide DC power for charging the electrical storage device.

Aspect 15. The electrically powered accessory of any of aspects 9-14, wherein the AC wire portion is configured to provide AC power for operating the electrically powered accessory.

Aspect 16. The electrically powered accessory of any of aspects 9-15, further comprising an electrical storage device, and wherein the AC wire portion is configured to provide AC power for charging the electrical storage device.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A method of transferring power, via a power cord, from an electric charging station to an electrically powered accessory that is configured to be used with at least one of a vehicle and a transport unit, the method comprising:
   a controller of the electrically powered accessory sending a request for power to the electric charging station via a ready signal sent through a proximity pilot contact of the power cord; and
   the electrically powered accessory receiving power from the electric charging station via the wire portion and the power contact arrangement of the power cord,
   wherein the power cord includes:
   a single plug; and
      a wire portion configured to provide power from the electric charging station to the electrically powered accessory,
   wherein the single plug includes:
      a power contact arrangement configured to connect to a power port of the electrically powered accessory; and
      a communication contact arrangement, that includes a proximity pilot contact, for connecting and communicating with the electric charging station.

2. The method of claim 1, further comprising, prior to the electrically powered accessory receiving power from the electric charging station, the controller sending a communication signal to the electric charging station via the proximity pilot contact of the communication contact arrangement to validate that the electrically powered accessory is valid to receive power from the electric charging station.

3. The method of claim 1, further comprising the controller locking the power cord to a receptacle of the electrically powered accessory upon the electrically powered accessory sending the request for power from the electric charging station.

4. The method of claim 1, the controller apportioning power received from the electric charging station via the power cord between the electrically powered accessory and the vehicle based on the request sent by the electrically powered accessory.

5. The method of claim 1, further comprising:
   the controller receiving an unlatch signal from the electric charging station via the proximity pilot contact of the power cord;
   the controller instructing a controlled shutdown for the connection with the electric charging station upon receiving the unlatch signal.

6. A power cord for transferring power to an electrically powered accessory, wherein the electrically powered accessory is configured to be used with at least one of a transport unit and a vehicle, the power cord comprising:
   a first wire portion to provide a first power to the electrically powered accessory, the first wire portion having a first end and a second end;
   an second wire portion to provide a second power to the electrically powered accessory, the second wire portion having a first end and a second end;
   a single plug at a first end of the power cord that is connected to the first end of the first wire portion, the single plug including:
      a first contact arrangement for connecting to a first power port of the electrically powered accessory,
      a second contact arrangement for connecting to a second power port of the electrically powered accessory, and
      a communication contact arrangement for connecting and communicating with at least one of a first power source and a second power source.

7. The power cord of claim 6, further comprising:
   a first wire plug connected to the second end of the first wire portion for connecting the power cord to the first power source; and
   a second wire plug connected to the second end of the second wire portion for connecting the power cord to the second power source.

8. The power cord of claim 6, wherein the first contact arrangement is a three-phase AC contact arrangement that includes a first line phase contact for distributing first phase AC power, a second line phase contact for distributing second phase AC power, a third line phase contact for distributing third phase AC power, and a neutral contact.

9. The power cord of claim 6, wherein the first contact arrangement is a single-phase AC contact arrangement that includes a line contact for distributing single phase AC power, and a neutral contact.

10. The power cord of claim 6, wherein the first wire portion and the second wire portion are bundled together within a single cable sheath.

11. The power cord of claim 6, wherein the second wire portion is configured to provide DC power for charging an electrically powered accessory electrical storage device of the electrically powered accessory.

12. The power cord of claim 6, wherein the first wire portion is configured to provide AC power for at least one of operating the electrically powered accessory and charging an electrically powered accessory electrical storage device of the electrically powered accessory.

13. An electrically powered accessory configured to be used with at least one of a vehicle and a transport unit, the electrically powered accessory comprising:
   a power cord for transferring power to the electrically powered accessory from one of an external AC power source and an external DC power source, the power cord including:
      a first wire portion to provide a first power to the electrically powered accessory, the first wire portion having a first end and a second end;
      an second wire portion to provide second power to the electrically powered accessory, the second wire portion having a first end and a second end;
      a single plug at a first end of the power cord that is connected to the first end of the first wire portion and connected to the first end of the second wire portion, the single plug including:
         a first contact arrangement for connecting to a first power port of the electrically powered accessory,
         a second contact arrangement for connecting to a second power port of the electrically powered accessory, and
         a communication contact arrangement for connecting and communicating with at least one of a first power source and a second power source.

14. The electrically powered accessory of claim 13, wherein the power cord further includes:

a first wire plug connected to the second end of the first wire portion for connecting the power cord to the first power source; and a second wire plug connected to the second end of the second wire portion for connecting the power cord to the second power source.

15. The electrically powered accessory of claim 13, wherein the first contact arrangement is a three-phase AC contact arrangement that includes a first line phase contact for distributing first phase AC power, a second line phase contact for distributing second phase AC power, a third line phase contact for distributing third phase AC power, and a neutral contact.

16. The electrically powered accessory of claim 13, wherein the first contact arrangement is a single-phase AC contact arrangement that includes a line contact for distributing single phase AC power, and a neutral contact.

17. The electrically powered accessory of claim 13, wherein the first wire portion and the second wire portion are bundled together within a single cable sheath.

18. The electrically powered accessory of claim 13, further comprising an electrical storage device, and wherein the second wire portion is configured to provide second power for charging the electrical storage device.

19. The electrically powered accessory of claim 13, wherein the first wire portion is configured to provide AC power for at least one of operating the electrically powered accessory and charging the electrical storage device.

* * * * *